(12) United States Patent
Andrus, Jr. et al.

(10) Patent No.: US 9,550,680 B2
(45) Date of Patent: Jan. 24, 2017

(54) CHEMICAL LOOPING INTEGRATION WITH A CARBON DIOXIDE GAS PURIFICATION UNIT

(71) Applicant: ALSTOM Technology Ltd, Baden (CH)

(72) Inventors: Herbert E. Andrus, Jr., Granby, CT (US); Glen D. Jukkola, Glastonbury, CT (US); Paul R. Thibeault, Windsor, CT (US); Gregory N. Liljedahl, Tariffville, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 495 days.

(21) Appl. No.: 13/923,800

(22) Filed: Jun. 21, 2013

(65) Prior Publication Data

US 2014/0377158 A1 Dec. 25, 2014

(51) Int. Cl.
*C01B 31/20* (2006.01)
*B01J 8/24* (2006.01)
(Continued)

(52) U.S. Cl.
CPC ............. *C01B 31/20* (2013.01); *B01D 53/002* (2013.01); *B01J 8/24* (2013.01); *B01D 53/22* (2013.01); *B01D 2256/22* (2013.01); *B01D 2257/80* (2013.01); *B01D 2258/0283* (2013.01); *F23C 2900/99008* (2013.01); *F23J 2215/50* (2013.01); *F23J 2900/15061* (2013.01); *Y02C 10/04* (2013.01); *Y02E 20/346* (2013.01)

(58) Field of Classification Search
CPC .................................. C01B 31/20; B01J 8/24

USPC ............................................... 423/437.1, 220
See application file for complete search history.

(56) References Cited

U.S. PATENT DOCUMENTS

| | | | |
|---|---|---|---|
| 4,952,223 A | 8/1990 | Kirshnamurthy et al. | |
| 2004/0237404 A1* | 12/2004 | Andrus, Jr. ............. | C01B 3/105 48/101 |

(Continued)

FOREIGN PATENT DOCUMENTS

| | | |
|---|---|---|
| CN | 101351530 A | 1/2009 |
| CN | 102036736 A | 4/2011 |

(Continued)

OTHER PUBLICATIONS

Unofficial translation of Japanese Office Action issued in connection with corresponding JP Application No. 2014-127800 on Feb. 22, 2016.

(Continued)

*Primary Examiner* — Matthew E Hoban
*Assistant Examiner* — James Fiorito
(74) *Attorney, Agent, or Firm* — GE Global Patent Operation; Stephen G. Midgley

(57) ABSTRACT

A chemical looping system that contains an oxidizer and a reducer is in fluid communication with a gas purification unit. The gas purification unit has at least one compressor, at least one dryer; and at least one distillation purification system; where the gas purification unit is operative to separate carbon dioxide from other contaminants present in the flue gas stream; and where the gas purification unit is operative to recycle the contaminants to the chemical looping system in the form of a vent gas that provides lift for reactants in the reducer.

8 Claims, 2 Drawing Sheets

(51) Int. Cl.
    *B01D 53/00*     (2006.01)
    *B01D 53/22*     (2006.01)

(56)           References Cited

U.S. PATENT DOCUMENTS

| | | |
|---|---|---|
| 2009/0288556 A1 | 11/2009 | Gearhart et al. |
| 2010/0024476 A1 | 2/2010 | Shah |
| 2010/0050654 A1 | 3/2010 | Chiu et al. |
| 2011/0048015 A1* | 3/2011 | Blatter .................. F01K 13/02 60/686 |
| 2011/0190939 A1 | 8/2011 | Lou et al. |
| 2011/0223083 A1 | 9/2011 | Bialkowski et al. |
| 2012/0230897 A1 | 9/2012 | Abanades Garcia et al. |

FOREIGN PATENT DOCUMENTS

| | | |
|---|---|---|
| CN | 102187153 A | 9/2011 |
| JP | 2011016873 A | 1/2011 |
| JP | 2011513861 A | 4/2011 |
| JP | 2011514601 A | 5/2011 |
| JP | 2011520759 A | 7/2011 |
| JP | 2011529848 A | 12/2011 |
| JP | 2013504421 A | 2/2013 |
| JP | 2013518353 A | 5/2013 |
| WO | 2011/110915 A1 | 9/2011 |

OTHER PUBLICATIONS

Unofficial translation of Japanese Notice of Allowance issued in connection with corresponding JP Application No. 2014-127800 on May 17, 2016.

* cited by examiner

CHEMICAL LOOPING INTEGRATION WITH A CARBON DIOXIDE GAS PURIFICATION UNIT

STATEMENT REGARDING FEDERALLY SPONSORED RESEARCH

The subject matter of the present invention was developed under a research contract with the U.S. Department of Energy (DOE), Contract Number DE-FE0009484. The Government of the United States has certain rights in the invention.

TECHNICAL FIELD

This disclosure relates to the integration of a chemical looping system with a carbon dioxide gas purification unit and to a method of providing a lift gas for the fuel reactor in a chemical looping system.

BACKGROUND

Chemical looping is a recently developed process which can be utilized in electrical power generation plants which burn fuels such as coal, oil, natural gas, biomass, and other fuels. The chemical looping process can be implemented in existing or new power plants, and provides promising improvements in terms of reduced plant size, reduced emissions, and increased plant operational efficiency, among other benefits.

The FIG. 1 depicts a chemical looping system 10 that comprises an oxidizer 12 and a reducer 14. In the oxidizer 12, a solid such as calcium sulfide (CaS) or a multivalent metal oxide (denoted as "Me") are oxidized with oxygen derived from air. For example, calcium sulfide is oxidized in the oxidizer 12 to calcium sulfate. The multivalent metal oxide is oxidized from a lower valence state to a higher valence metal oxide (e.g., FeO is oxidized to Fe2O3). The calcium sulfate and the metal oxide are also called solid oxygen generators. Nitrogen and oxygen are released from the oxidizer as hot exhaust gases. The hot calcium sulfate is then transported to a reducer 14, where calcium sulfate is reduced to calcium sulfide with the release of oxygen. The released oxygen is used to combust a fuel (e.g., a solid fuel such as coal) supplied to the reducer 14. The combustion of the solid fuel in the reducer 14 produces carbon dioxide and small amounts of water along with other contaminants (hereinafter called "flue gases"). The reduced calcium sulfide from the reducer is then discharged back to the oxidizer 12 thus providing the chemical loop and the thermal loop for the process.

In summary, a chemical looping system utilizes a high temperature process, whereby solids such as calcium- or metal-based compounds are "looped" between a first reactor, called an oxidizer (or an air reactor), and a second reactor, called a reducer (or a fuel reactor). In the oxidizer, oxygen from air injected into the oxidizer is captured by the solids in an oxidation reaction. The heat liberated by the oxidation raises the temperature of the solids and the gases. The captured oxygen is then carried by the hot oxidized solids to the reducer to be used for combustion and/or gasification of a fuel such as coal, for example. After a reduction reaction in the reducer, the solids, no longer having the captured oxygen, are returned to the oxidizer to be oxidized again. This cycle is repeated.

Even though gases are generated by combustion in the reducer and in the oxidizer, there is a need to use a lift gas in both the oxidizer and the reducer in order to facilitate lifting the solid fuel and the solid oxygen generator (CaSO4 or the metal oxide) into a combustion zone in the oxidizer and reducer so as to facilitate efficient combustion. In order to do so, an external lift gas is fed to either the oxidizer, the reducer, or to both. In the case of the oxidizer, the air provides the lift gas as well as the source of oxygen. In the case of the reducer, a gas that is reactive with the fuel is desired for providing lift. This gas can either be steam from the steam generation part of the power plant or carbon dioxide from a gas purification unit (GPU). Since the final product from the combination of the reducer and the gas processing unit in sequence is a relatively pure carbon dioxide stream, it is therefore desirable to use a lift gas that does not add additional contaminants to the flue gases.

SUMMARY

Disclosed herein is a system comprising a chemical looping system comprising an oxidizer in fluid communication with a reducer; where the oxidizer is operative to oxidize a multivalent metal oxide or a calcium sulfide to a higher valent metal oxide or to a calcium sulfate respectively; and where the reducer is operative to reduce the metal oxide to a lower valent metal oxide or the calcium sulfate to calcium sulfide; where the chemical looping system generates a flue gas stream comprising carbon dioxide during the reducing of the metal oxide or the reducing of the calcium sulfate; a gas purification unit in a recycle loop with the chemical looping system; where the gas purification unit comprises at least one compressor, at least one dryer; and at least one distillation purification system; where the gas purification unit is operative to separate carbon dioxide from other contaminants present in the flue gas stream; and where the gas purification unit is operative to recycle the contaminants to the chemical looping system in the form of a vent gas that provides lift for reactants in the reducer.

Disclosed herein is too is a method comprising discharging a flue gas stream from a chemical looping system to a gas purification unit; where the chemical looping system comprises an oxidizer in fluid communication with a reducer; where the oxidizer is operative to oxidize a multivalent metal oxide or a calcium sulfide to a higher valent metal oxide or to a calcium sulfate respectively; and where the reducer is operative to reduce the metal oxide to a lower valent metal oxide or the calcium sulfate to calcium sulfide; where the chemical looping system generates a flue gas stream comprising carbon dioxide during the reducing of the metal oxide or the reducing of the calcium sulfate; compressing the flue gas stream in the gas purification unit; where the gas purification unit comprises at least one compressor, at least one dryer; and at least one distillation purification system; separating carbon dioxide from other contaminants present in the flue gas stream; and recycling the contaminants to the chemical looping system in the form of a vent gas that provides lift for reactants in the reducer.

DETAILED DESCRIPTION

Disclosed herein is the use of a stream of vent gas obtained from a gas purification unit for use as a feed stream to the reducer (i.e., the fuel reactor). The stream of vent gas is used as a lift gas to carry solids (e.g., the solid fuel and the solid oxygen carrier) up from the bottom of the reducer into a combustion zone in the reducer so that a solid fuel can react with a solid oxygen carrier to produce combustion and generate heat. The stream of vent gas is also sometimes referred to as a lift gas because of its utility in lifting solid particles of the solid fuel and the solid oxygen carrier into the combustion zone of the reducer.

In an embodiment, the lift gas can be steam from the steam generation portion of the power plant or carbon dioxide from the product gas. Since the goal of the power plant is to generate electricity from the produced steam, the use of steam for lift gas purposes will reduce the power output of the plant, thereby reducing the efficiency of the plant and increasing the cost. Product carbon dioxide (produced in the reducer) can be utilized for lift gas, but in those cases where carbon dioxide is being sold rather than sequestered, there is an economic loss associated with using product carbon dioxide. By using the vent gases from a gas purification unit, the amount of lift gas needed in the reducer can be reduced. Further, because these vent gases comprise carbon bearing compounds, they can act as a fuel source, thus improving the overall conversion of fuel to carbon dioxide. This serves to increase the overall efficiency of the process. It also helps to reduce the emissions from the process. For example, the sulfur and the carbon monoxide generated as a result of combustion will be recycled to the fuel reactor giving the carbon monoxide the opportunity to convert to carbon dioxide and sulfur the opportunity to convert to calcium sulfide or calcium sulfate.

Figure 1:
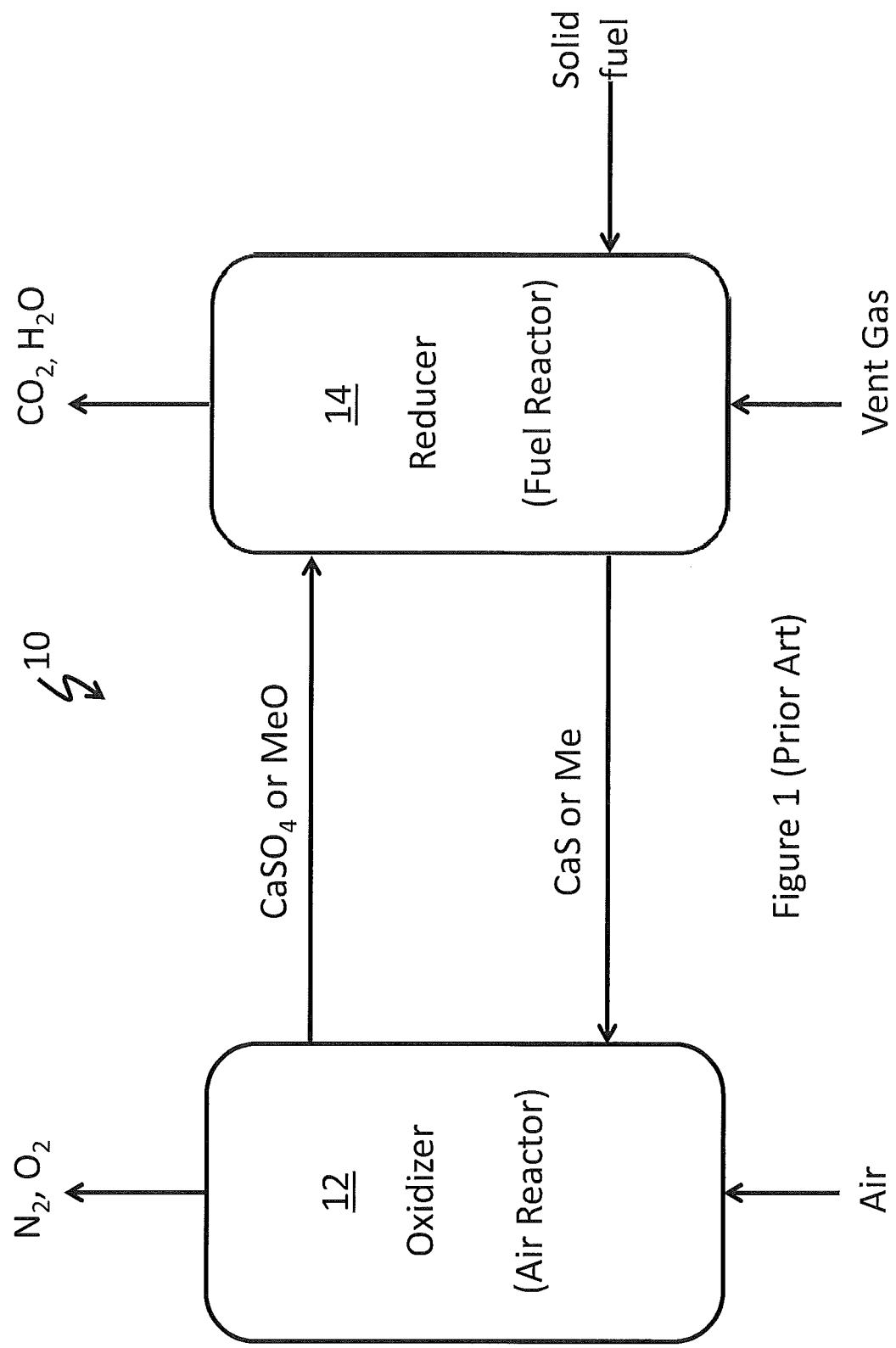
FIG. 1 is a depiction of a chemical looping system that comprises an oxidizer and a reducer.
Figure 2:
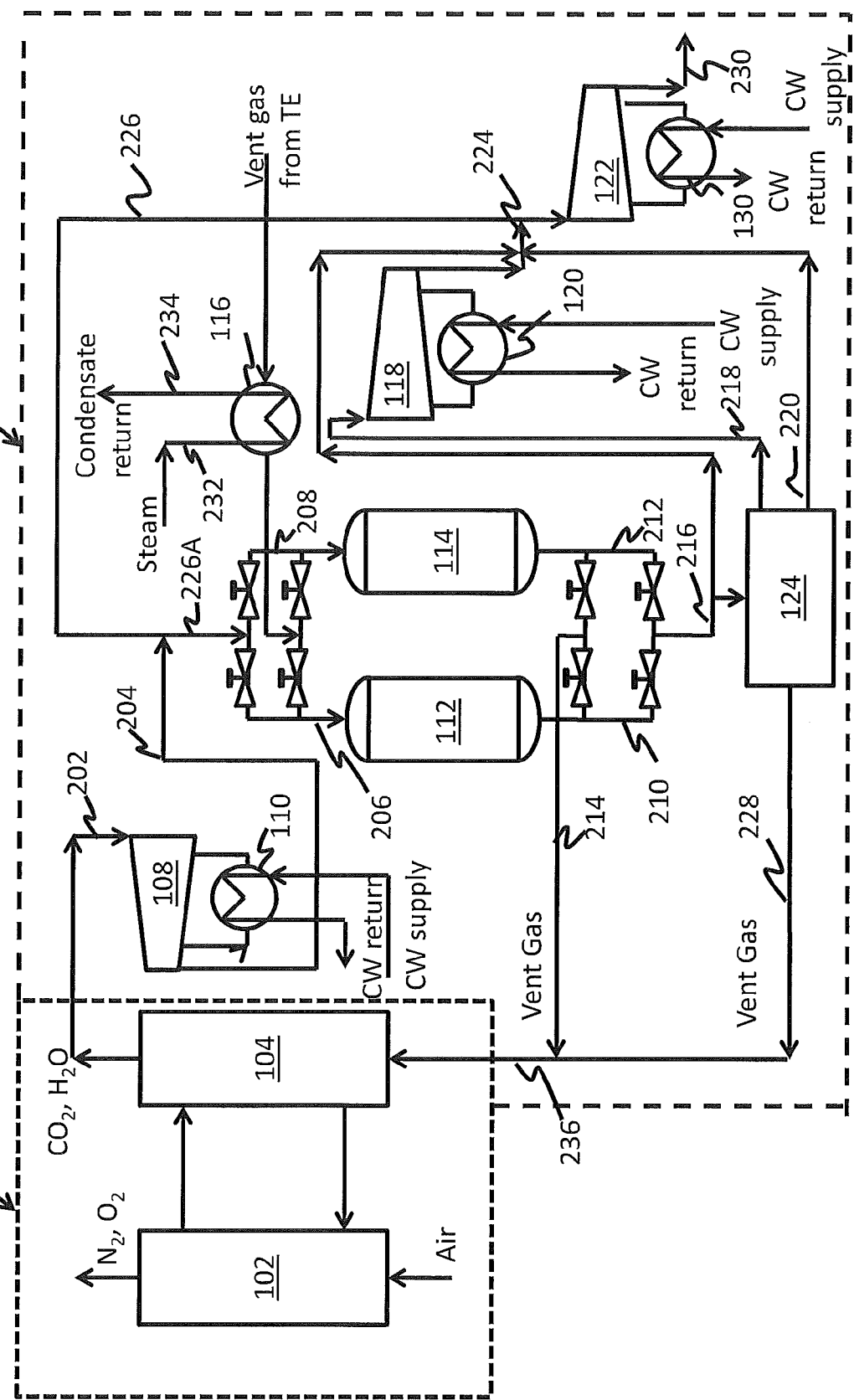
FIG. 2 is a schematic description of a chemical looping system in fluid communication with a gas purification unit that generates vent gases that can be used for producing a lift gas for use in the reducer of the chemical looping system.

The FIG. 2 is a depiction of an exemplary system 100 that comprises a chemical looping system 200 that is integrated with a gas purification unit (GPU) 300. The chemical looping system 200 comprises an oxidizer 102 in fluid communication with a reducer 104. The gas purification unit 300 comprises a plurality of compressors 108, 118 and 122 in fluid communication with a plurality of dryers 112 and 114. The dryers are arranged to be in parallel or in series with each other. Compressor 108 lies upstream of the dryers 112 and 114, while compressors 118 and 122 lie downstream of both dryers 112 and 114. Compressor 122 lies downstream of the compressor 118. Each of the compressors 108, 118 and 122 are in operative communication with a heat exchanger 110, 120 and 130 respectively. Each of the heat exchangers exchange the heat of compression with cooling water. The cooling water upon absorbing the heat can be used to provide some feed water heating in the power plant feedwater cycle. There will be some limit on the amount of feed water heating that can be utilized, which will depend upon the steam cycle that is utilized and other sources of low level heat in the overall process. The gas purification unit 300 also comprises a cryogenic distillation purification system 124, which lies downstream of the dryers 112 and 114.

As detailed earlier, in the chemical looping system 200 calcium sulfide or a multivalent metal oxide is oxidized in the oxidizer 102 producing calcium sulfate or a higher valent state metal oxide. Nitrogen and oxygen are produced as byproducts of the oxidizer. The hot calcium sulfate and/or the hot metal oxide are transported to the reducer 104 where they are reduced to release oxygen, which is used to combust a solid fuel (e.g., a coal). A flue gas stream 202 comprising carbon dioxide and water vapor obtained as byproducts in the reducer 104 are transferred to the gas purification unit 300 and are charged to a compressor 108, where they are compressed. The carbon dioxide and water released from the compressor 108 are also termed the "flue gas stream".

This compression is conducted to reduce the gas volume for treatment. The gas volume is reduced by an amount of 50 to 80 percent in the compressor 108. In a preferred embodiment, the gas volume is reduced by an amount of 60 to 75 percent in the compressor 108. Cooling water (CW in the FIG. 2) may be used to absorb heat generated by the compression of the flue gas stream.

The compressed flue gas stream 204 emanating from the compressor 108 is then combined with a carbon dioxide containing stream 226 that emanates from the compressor 118 to form a combined compressed gas stream 226A. The combined compressed gas stream 226A containing the flue gas and carbon dioxide is then charged to the dryers 112 and 114. The dryers are operative to remove water from the combined compressed gas stream 226A.

The dryer system (i.e., dryers 112 and 114) starts with a heat exchanger to drop the temperature of the gas to the point where water vapor is condensed to liquid water. The liquid water is separated from the gas stream in a knockout drum (not shown). The recovered water can be recycled to the power plant for water makeup to the system. The flue gas leaving the knock out drum is directed to a fixed bed containing a dessicant material that absorbs water vapor. The gas leaving the drying system is essentially free of water vapor.

The removal of water by the dryers produces a more concentrated carbon dioxide stream 216. The removal of water is useful to the next step in the purification process. In this next step, the gas undergoes a cryogenic process which will drop the gas temperature below the freezing point of water. In order to avoid the subsequent problems associated with water freezing inside of the equipment, the drying process is desirable.

A portion of the concentrated carbon dioxide stream 216 is charged to a cryogenic distillation purification system 124. In the cryogenic process, the gas temperature is further reduced to the point where the gas is condensed into a liquid. This liquid is sent to a distillation column. In the distillation column, the carbon dioxide is separated from the remaining contaminants in the gas by boiling the liquid at low temperature. The cryogenic distillation purification system can separate carbon dioxide (see streams 218 and 220) from the other contaminants (see stream 228) present in the concentrated carbon dioxide stream 216. The contaminants include methane, carbon monoxide, hydrogen, oxygen, hydrogen sulfide and sulfur dioxide and these contaminants are collectively termed the "inert vent" stream. Another vent stream 214 (termed the dryer vent stream) may be directly used (after undergoing drying in the dryers 112 and 114) in the chemical looping system without being subjected to the cryogenic distillation purification system. This stream would be the primary source of carbon dioxide to be used as lift gas. The inert vent stream 228 can be combined with the dryer vent stream 214 to form the vent gas stream 236.

The inert vent stream 228 and/or the dryer vent stream 214 are/is recycled to the reducer to provide lift to the solids that are combusted in the reducer. In an embodiment, only the inert vent stream 228 is recycled to the reducer. In another embodiment, only the dryer vent stream 214 is recycled to the reducer. In yet another embodiment, both inert the vent stream 228 and the dryer vent stream 214 are recycled to the reducer to provide lift to the solids (fuel and oxygen carrier) that are combusted in the reducer 104. It is to be noted that the vent stream 214 does not contact the cryogenic distillation purification system.

In another embodiment, the vent stream 214 can be contacted with lime (CaO) in a vessel (not shown) to capture carbon dioxide as calcium carbonate, which can be utilized as make up limestone to the chemical looping process. The gas leaving this vessel continues as the vent stream to the reducer. In a further embodiment, a semi-permeable membrane can be utilized (not shown) to further separate carbon dioxide from the other compounds in the vent stream when additional carbon dioxide product is desired. The gas leaving the membrane system is sent to the reducer.

The use of the vent gas to provide lift to the solids is advantageous in that amounts of other primary gases used to provide lift can be reduced. Further because the vent gases contain carbon compounds, they can act as a fuel source thus improving the overall conversion of fuel to carbon dioxide. This facilitates an increase in the overall efficiency of the process.

The carbon dioxide stream emanating from the cryogenic purification distillation system is split into two streams 218 and 220 depending upon the pressure of the respective streams. Stream 218 is the low pressure carbon dioxide stream and is charged to compressor 118, while stream 220 is the high pressure carbon dioxide stream and is charged to the compressor 122. The output of compressor 118 is also charged to the compressor 122. The final carbon dioxide product (now highly purified) leaves the gas purification unit 300 and may be sequestered or used for some other commercial purpose such as, for example, food processing or enhanced oil recovery. The compressor 122 delivers the high purity carbon dioxide stream 230 at pipeline pressures that the downstream processes desire.

In an embodiment, in order to aid in the drying process, steam from the power plant (not shown) can be used to heat the vent gas 214 from the cryogenic distillation purification system 124 and recycle that gas to the dryers 112 and 114. This exchange of heat takes place in the heat exchanger 116. The steam 232 enters a heat exchanger 116 that heats up the vent gas. The cooler vent gas condenses the steam. The condensed stream is returned to the power plant via stream 234.

In summary, it is desirable to use either the "inert vent gas" or the dryer vent gas, or both as a feed stream (i.e., a lift stream) to the reducer in the chemical looping process. Although the fuel reactor produces a gas as the solid fuel reacts with the solid oxygen carrier (e.g., $CaSO_4$ or MeO), it is desirable to use a "lift gas" at the bottom of the reactor that carries the solids up and allows these reactions to take place.

By using the vent gases from the gas purification unit 300, the amount of external lift gas needed in the reducer can be reduced. Further, because these vent gases contain carbon compounds, they can act as a fuel source, thus improving the overall conversion of fuel to carbon dioxide. This serves to increase the overall efficiency of the process. It also helps to reduce the emissions from the process. For example, the sulfur and the carbon monoxide will be recycled to the fuel reactor thereby facilitating a conversion of carbon monoxide to carbon dioxide and facilitating a conversion of the sulfur to calcium sulfide or calcium sulfate. Since these gases are normally vented, the emissions from the gas purification unit are reduced.

Thus, by integrating the potential vent streams from the gas purification unit back into the chemical looping process, the overall efficiency is increased and the overall emissions are reduced. The increase in efficiency, coupled with the reduced emissions serves to reduce the specific cost of the plant, improve the overall carbon dioxide capture, and the reduce the cost per ton of carbon dioxide captured.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, singular forms like "a," or "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term and/or is used herein to mean both "and" as well as "or". For example, "A and/or B" is construed to mean A, B or A and B. The transition term "comprising" is inclusive of the transition terms "consisting essentially of" and "consisting of" and can be interchanged for "comprising".

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method comprising:
    discharging a flue gas stream from a chemical looping system to a gas purification unit; where the chemical looping system comprises:
        an oxidizer in fluid communication with a reducer; where the oxidizer is operative to oxidize an oxygen carrier including multivalence metal oxide or a calcium sulfide to a higher valence metal oxide or to a calcium sulfate respectively; and where the reducer is operative to reduce the oxygen carrier by reducing metal oxide to a lower valence metal oxide or the calcium sulfate to calcium sulfide; where the chemical looping system generates a flue gas stream comprising carbon dioxide during the reducing of the metal oxide or the reducing of the calcium sulfate; and
    compressing the flue gas stream in the gas purification unit; where the gas purification unit comprises:
        at least one compressor to compress the flue gas stream,
        at least one dryer to remove water from the flue gas stream compressed by the at least one compressor; and
        at least one distillation purification system;
        separating carbon dioxide from other contaminants present in the flue gas stream exiting the at least one dryer; and
        recycling the contaminants to the reactor of the chemical looping system in the form of a vent gas to carry the oxygen carrier upward within the reducer, without removing carbon monoxide from the flue gas or the contaminants;
    wherein compressing the gas stream occurs at least prior to separating the carbon dioxide from the contaminants present in the flue gas stream.

2. The method of claim 1, further comprising distilling a portion of the vent gas in the distillation purification system.

3. The method of claim 1, further comprising drying the flue gas stream to remove water present.

4. The method of claim 3, further comprising splitting the flue gas stream into two streams, of which one stream is recirculated to the reducer of the chemical looping system via the distillation purification system while the other stream is directly recycled to the reducer of the chemical looping system without contacting the distillation purification system.

5. The method of claim 4, where the stream that contacts the distillation purification system is further split into two streams—one of which comprises the contaminants and the other comprising carbon dioxide; and where the stream that comprises the carbon dioxide is further compressed in one or more compressors.

6. The method of claim 4, further comprising contacting the stream emanating from the distillation purification system with calcium oxide to further remove carbon dioxide from the vent stream; and where the vent stream is recycled to the reducer after removal of the carbon dioxide.

7. The method of claim 3, further comprising contacting the stream emanating from the distillation purification system with a semi-permeable membrane to further remove carbon dioxide from the vent stream; and where the vent stream is recycled to the reducer after removal of the carbon dioxide.

8. The method system of claim 1, where the vent gas comprises methane, carbon monoxide, hydrogen, oxygen, hydrogen sulfide and sulfur dioxide.

* * * * *